(12) United States Patent
Clemen (10) Patent No.: US 9,366,148 B2
(45) Date of Patent: Jun. 14, 2016

(54) ASSEMBLY OF AN AXIAL TURBOMACHINE AND METHOD FOR MANUFACTURING AN ASSEMBLY OF THIS TYPE

(71) Applicant: Rolls-Royce Deutschland Ltd & Co KG, Blankenfelde-Mahlow (DE)

(72) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 433 days.

(21) Appl. No.: 14/013,756

(22) Filed: Aug. 29, 2013

(65) Prior Publication Data
US 2014/0064952 A1  Mar. 6, 2014

(30) Foreign Application Priority Data

Aug. 30, 2012  (DE) .......................... 10 2012 215 412

(51) Int. Cl.
| | |
|---|---|
| *F01D 5/14* | (2006.01) |
| *F01D 25/24* | (2006.01) |
| *F04D 29/40* | (2006.01) |
| *F03D 5/00* | (2006.01) |
| *F01D 9/02* | (2006.01) |
| *F01D 9/04* | (2006.01) |
| *F04D 29/54* | (2006.01) |
| *F04D 29/64* | (2006.01) |

(52) U.S. Cl.
CPC .. *F01D 9/02* (2013.01); *F01D 5/14* (2013.01); *F01D 9/023* (2013.01); *F01D 9/041* (2013.01); *F04D 29/541* (2013.01); *F04D 29/542* (2013.01); *F04D 29/644* (2013.01); *F05D 2220/3219* (2013.01); *Y02T 50/673* (2013.01); *Y02T 50/675* (2013.01)

(58) Field of Classification Search
CPC ........... F01D 5/14; F01D 9/023; F01D 9/041; F01D 29/541; F01D 9/02; F04D 29/542; F04D 29/644; F05D 2220/3219; Y02T 50/673; Y02T 50/675
USPC .............. 415/208.2, 208.1, 211.2, 115, 214.1
See application file for complete search history.

(56) References Cited

U.S. PATENT DOCUMENTS

| | | | | | |
|---|---|---|---|---|---|
| 3,703,081 | A | * | 11/1972 | Krebs ........................ | F01D 5/06 415/214.1 |
| 3,777,489 | A | * | 12/1973 | Johnson ................... | F01D 9/065 415/144 |
| 4,466,239 | A | * | 8/1984 | Napoli ..................... | F01D 5/082 415/116 |
| 4,920,741 | A | * | 5/1990 | Liebl ......................... | F02C 7/18 415/115 |
| 4,961,309 | A | * | 10/1990 | Liebl ......................... | F02C 7/18 415/115 |
| 5,077,967 | A | | 1/1992 | Widener et al. | |
| 5,174,105 | A | * | 12/1992 | Hines ........................ | F02C 3/10 60/774 |

(Continued)

FOREIGN PATENT DOCUMENTS

| | | |
|---|---|---|
| DE | 10 2007 004 741 | 8/2008 |
| DE | 10 2009 023 100 | 2/2010 |

(Continued)

*Primary Examiner* — Thai Ba Trieu
(74) *Attorney, Agent, or Firm* — Timothy J. Klima; Shuttleworth & Ingersoll, PLC (57) ABSTRACT

An assembly of an axial turbomachine includes at least one outlet guide vane of a compressor and a diffuser arranged downstream of the outlet guide vane in the flow direction. The outlet guide vane is connected to the compressor and the diffuser is connected to the combustion chamber, without there being a direct mechanical connection between the diffuser and the outlet guide vane.

18 Claims, 8 Drawing Sheets

(56) References Cited

U.S. PATENT DOCUMENTS

| | | | | |
|---|---|---|---|---|
| 5,338,155 A | * | 8/1994 | Kreitmeier | F01D 25/30 415/211.2 |
| 5,592,820 A | | 1/1997 | Alary et al. | |
| 8,561,410 B2 | * | 10/2013 | Mulcaire | F04D 29/542 60/751 |
| 2010/0031631 A1 | | 2/2010 | Ramm | |
| 2010/0303629 A1 | | 12/2010 | Guemmer | |
| 2011/0192166 A1 | * | 8/2011 | Mulcaire | F04D 29/542 60/751 |
| 2011/0236184 A1 | | 9/2011 | Benkler et al. | |
| 2011/0250055 A1 | | 10/2011 | Cornelius et al. | |
| 2013/0224007 A1 | * | 8/2013 | Rodriguez | F01D 9/041 415/208.1 |

FOREIGN PATENT DOCUMENTS

| | | |
|---|---|---|
| EP | 0651207 | 5/1995 |
| EP | 1431516 | 6/2004 |
| EP | 1 574 667 | 9/2005 |
| EP | 2 194 234 | 6/2010 |
| EP | 2 474 744 | 7/2012 |
| WO | 2010/063583 | 6/2010 |

* cited by examiner

ASSEMBLY OF AN AXIAL TURBOMACHINE AND METHOD FOR MANUFACTURING AN ASSEMBLY OF THIS TYPE

CROSS-REFERENCE TO RELATED APPLICATION

This application claims the benefit of German Patent Application No. 10 2012 215 412.4 filed on Aug. 30, 2012, the entirety of which is fully incorporated herein by reference.

BACKGROUND

This invention relates to an assembly of an axial turbomachine and to a method for manufacturing an assembly of this type. An assembly of this type is for example arranged in a jet engine.

It is known that at the end of a high-pressure compressor of a gas turbine, an outlet guide vane is arranged that removes the swirl from the flow in order to permit an axial flow out of the compressor. Before the flow is supplied to an adjoining combustion chamber, it is decelerated in a diffuser with the lowest possible losses, the aim being a maximum pressure recovery. It is also known to design such an outlet guide vane and such a diffuser as one integral component that is connected to the combustion chamber.

An axial turbomachine is known from WO 2010/063583 A1, where a ring diffuser is arranged downstream of an outlet guide vane of a compressor stage. It is provided that both the outer wall of the outlet guide vane and the outer wall of the ring diffuser are formed by a guide vane carrier, so that the ring diffuser is fastened to the outlet guide vane.

There is a need to design assemblies of the type described with low tolerances in order to avoid both negative effects on the flow deflection in the outlet guide vane and pressure losses.

SUMMARY

Accordingly, an object underlying the present invention is to provide an assembly of an axial turbomachine having an outlet guide vane and a compressor, in which at least the outlet guide vane is designed with low tolerances. Furthermore, a method for manufacturing an assembly of this type is to be provided.

According to an exemplary embodiment of the invention, it is provided that at least one outlet guide vane of the assembly is connected to the compressor, and that the diffuser is connected to the combustion chamber, without there being a direct mechanical connection between the diffuser and the outlet guide vane. The teachings in accordance with the invention thus provide that at least one outlet guide vane and the diffuser are separate parts which are connected to different structural components, i.e. on the one hand to the compressor and on the other hand to the combustion chamber.

Accordingly, there is a leakage gap between the outlet guide vane and the diffuser in the flow direction. It can be provided that this leakage gap is used selectively for removal of leakage air. It is known here, to supply leakage air tapped downstream of a compressor as cooling air to a turbine arranged downstream of the combustion chamber.

It is pointed out that the assembly in accordance with the invention can have several outlet guide vanes, with each outlet guide vane including exactly one blade row. It is not necessary here that each of these outlet guide vanes represents a part separate from the diffuser. The present invention only requires that at least one outlet guide vane is connected to the compressor and is designed without a direct mechanical connection to the diffuser. This can however also apply for the further outlet guide vanes if more than one outlet guide vane is present.

The solution in accordance with the invention has the advantage that by the separate design of at least one outlet guide vane on the one hand and of the diffuser on the other, the at least one outlet guide vane and the diffuser can be manufactured as separate structural units. This permits precise production in particular of the outlet guide vane. As a result, a higher quality of the outlet guide vane, for example with regard to its surface and geometry, can be achieved, the advantage being reduced outlet guide vane losses and an improved flow deflection. The separation in accordance with the invention between the outlet guide vane on the one hand and the diffuser on the other furthermore permits flexibility in material selection, in that the outlet guide vane and the diffuser do not have to be made of the same material. Furthermore, the diffuser can be produced cost-effectively.

The outlet guide vane can be manufactured for example by electrical discharge machining (EDM), grinding, milling, sintering or electrochemical machining (ECM). The diffuser is for example manufactured as a casting, with the diffuser also being producible in a different manner, for example using the aforementioned manufacturing methods.

The solution in accordance with the invention provides in one embodiment the possibility of achieving an improvement of the outlet guide vane and diffuser flow, in that a leakage gap, which in the state of the art is provided directly downstream of the last rotor stage, is arranged in accordance with the invention between the outlet guide vane and the diffuser. Alternatively, it can also be provided that a leakage gap of this type between outlet guide vane and diffuser is used additionally to a leakage gap provided directly downstream of the last rotor stage. In the case of one-sided mounting of the blade row of the outlet guide vane, there is furthermore the possibility of achieving an improvement of the outlet guide vane and diffuser flows by the use of hub gaps.

An outlet guide vane, also referred to as OGV, is usually provided by the stator stage of the last compressor stage of a compressor. The diffuser has the task of reducing the velocity of the air exiting the compressor. The kinetic energy of the flow is here converted into a static pressure increase and the air is supplied to the combustion chamber with as uniform a distribution as possible.

In accordance with an exemplary embodiment of the invention, the outlet guide vane is connected to an outer casing of the compressor. An outer casing of this type is a structural element of the compressor, to which the stator stages of further compressor stages of the compressor are fastened. Generally speaking, the precise part of the compressor on/to which the outlet guide vane is connected is however immaterial for the invention. It can also be fastened to any other non-rotating element of the compressor or be formed by such an element.

The diffuser is in one exemplary embodiment connected to an inner combustion chamber casing of the combustion chamber. Generally speaking, the diffuser can however also be connected to any other structural element of the combustion chamber connected on the intake side of the combustion chamber.

In accordance with an exemplary embodiment of the invention, the outlet guide vane is designed with a hub gap extending between the blade ends of the outlet guide vane and the hub of the outlet guide vane. The blade ends are mounted on one side in accordance with this exemplary embodiment. The resultant hub gap can be used to favourably influence the outlet guide vane and diffuser flows, if necessary in conjunction with the leakage gap provided between the outlet guide vane and the diffuser.

Since the blade ends of the outlet guide vane are designed at a distance to the hub of the outlet guide vane, it can be provided in a development of this exemplary embodiment that the hub of the outlet guide vane is connected to the rotor hub or the rotor disk of a rotor arranged upstream of the outlet guide vane in the flow direction. The hub is thus designed rotating.

In accordance with an alternative embodiment, the outlet guide vane is designed without a hub gap between the blade ends of the outlet guide vane and the hub of the outlet guide vane. The hub of the outlet guide vane forms in this case an integral part of the outlet guide vane. In this case, it can be provided that the assembly additionally includes a shroud that at least partially closes a leakage gap between a rotor arranged upstream of the outlet guide vane in the flow direction and the outlet guide vane. With the arrangement of a shroud of this type, leakage air can flow off exclusively through the leakage gap provided between the outlet guide vane and the diffuser.

In accordance with a further exemplary embodiment of the present invention, the assembly includes at least two outlet guide vanes, which are provided in tandem arrangement, meaning directly behind one another in the flow direction. Each outlet guide vane here forms precisely one blade row.

In accordance with a design variant, the two outlet guide vanes are each manufactured as separate parts and welded and/or bolted to one another. Bolting is for example achieved using flange connections. Both outlet guide vanes are connected to the compressor, whereas the diffuser is connected to the combustion chamber. It can be provided here that both outlet guide vanes are fastened to the outer casing of the compressor, whereas the hub of the outlet guide vanes is connected to the rotor hub or to the rotor disk of a rotor arranged upstream of the outlet guide vanes in the flow direction, so that the hub is in turn designed rotating. In this case there is a hub gap between the blade ends of the outlet guide vanes and the hub.

In accordance with an alternative design variant, only one or some of the at least two outlet guide vanes is, are connected to the compressor, whereas at least one outlet guide vane is connected to the diffuser or is designed in one piece with the latter. In the case of two outlet guide vanes, therefore, the one outlet guide vane is assigned to the compressor module and the other outlet guide vane to the combustion chamber module. In this case the leakage gap is located between the two outlet guide vanes. It can be provided here that the outlet guide vane connected to the diffuser is designed together with the latter as an inexpensive casting, whereas the upstream outlet guide vane connected to the compressor is designed with high precision, for example by milling or forging.

A design variant of the present invention provides that struts are integrated into the diffuser for absorbing mechanical loads. They are generally used to absorb structural or mechanical loads and connect in particular the inner and the outer diffuser rings. Struts can however be dispensed with if an outlet guide vane connected to the diffuser has a sufficient structural strength to absorb mechanical loads too. Accordingly, an embodiment of the invention provides that the at least one outlet guide vane connected to the diffuser or designed in one piece with the latter itself forms the struts and, is thus suitable for absorbing mechanical loads. The blades of the outlet guide vane thus perform the function of absorbing mechanical loads additionally to their aerodynamic function.

It can furthermore be provided that the struts have an aerodynamic profile and effect a further deflection of the airflow. Designing the struts in this way represents an option particularly when only a single outlet guide vane with one blade row is provided and is connected to the compressor. By providing struts with an aerodynamic profile, the air can undergo further alignment in the axial direction before entering the combustion chamber.

The invention furthermore relates to a method for manufacturing an assembly of an axial turbomachine, including at least one outlet guide vane of a compressor and a diffuser arranged downstream of the outlet guide vane in the flow direction. The method includes the following steps:

separate manufacture of at least one outlet guide vane and of the diffuser, and connecting the at least one outlet guide vane to the compressor and connecting the diffuser to the combustion chamber, without there being a direct mechanical connection between the diffuser and the outlet guide vane.

The outlet guide vane is preferably manufactured in high quality for example by electrical discharge machining (EDM), grinding, milling, sintering or electrochemical machining (ECM). The diffuser is manufactured in one exemplary embodiment as an inexpensive casting.

BRIEF DESCRIPTION OF THE DRAWINGS

The present invention is described in the following in more detail in light of the figures of the accompanying drawing, showing several exemplary embodiments.

DETAILED DESCRIPTION

The invention is described in the following by way of example, using an assembly integrated into a jet engine. The principles of the present invention apply however in the same way for other axial turbomachines.

Figure 11:
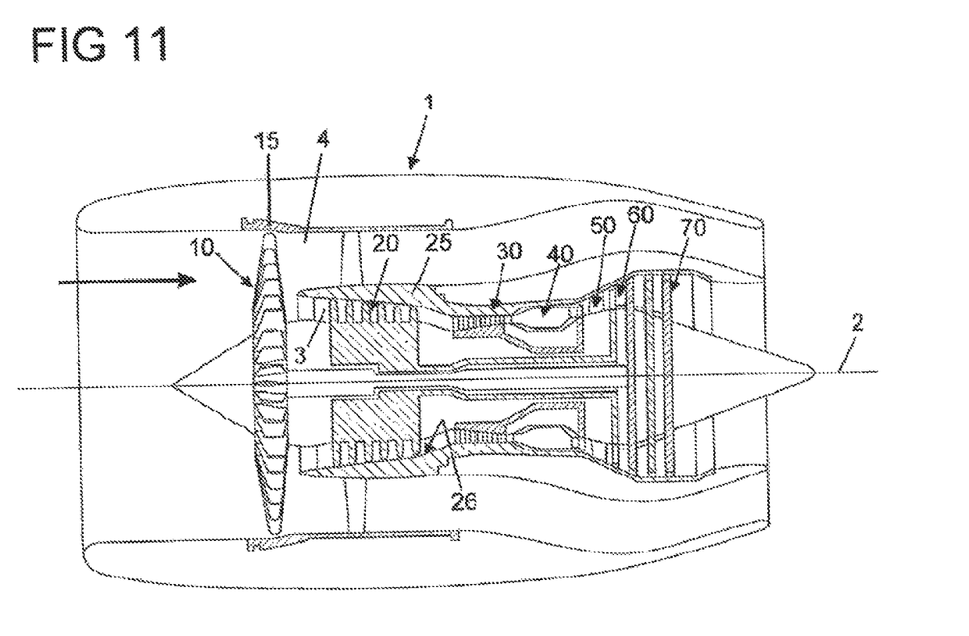
FIG. 11 shows in simplified representation an exemplary embodiment of a jet engine into which an assembly in accordance with the present invention is integrated.

FIG. 11 shows an exemplary embodiment of a dual-flow jet engine 1 having in a manner known per se a fan stage 10 with a fan as a low-pressure compressor, an intermediate-pressure compressor 20, a high-pressure compressor 30, a combustion chamber 40, a high-pressure turbine 50, an intermediate-pressure turbine 60 and a low-pressure turbine 70. The intermediate-pressure compressor 20 and the high-pressure compressor 30 each include a plurality of compressor stages, having a rotor stage and a stator stage each.

The fan stage 10 has a fan casing 15 which on the inside features an annular surface limiting a secondary flow duct 4 of the jet engine 1 radially outwards. The intermediate-pressure compressor 20 and the high-pressure compressor 30 are surrounded by a circumferential casing 25 which has on the inside an annular surface 26 limiting the flow duct 3 for the primary flow of the jet engine radially outwards. Radially inwards, the flow duct 3 is formed by appropriate rim surfaces of the rotors and stators of the respective compressor stages, or by the hub or elements of the appropriate drive shaft connected to the hub. The flow duct 3 for the primary flow is also referred to as annular space and the surface 26 as annular surface.

The components described have a common symmetry axis 2 representing the center axis for the stator stages and the casings as well as the rotary axis for the rotor stages of the jet engine.

In the context of the present invention, the transition area between the high-pressure compressor 30 and the combustion chamber 40, in which an outlet guide vane and a diffuser are provided, is particularly important. Before the invention is explained in detail in light of the FIGS. 1 to 10, the state of the art is briefly dealt with, making reference to FIG. 12, for a better understanding of the invention.

Figure 12:
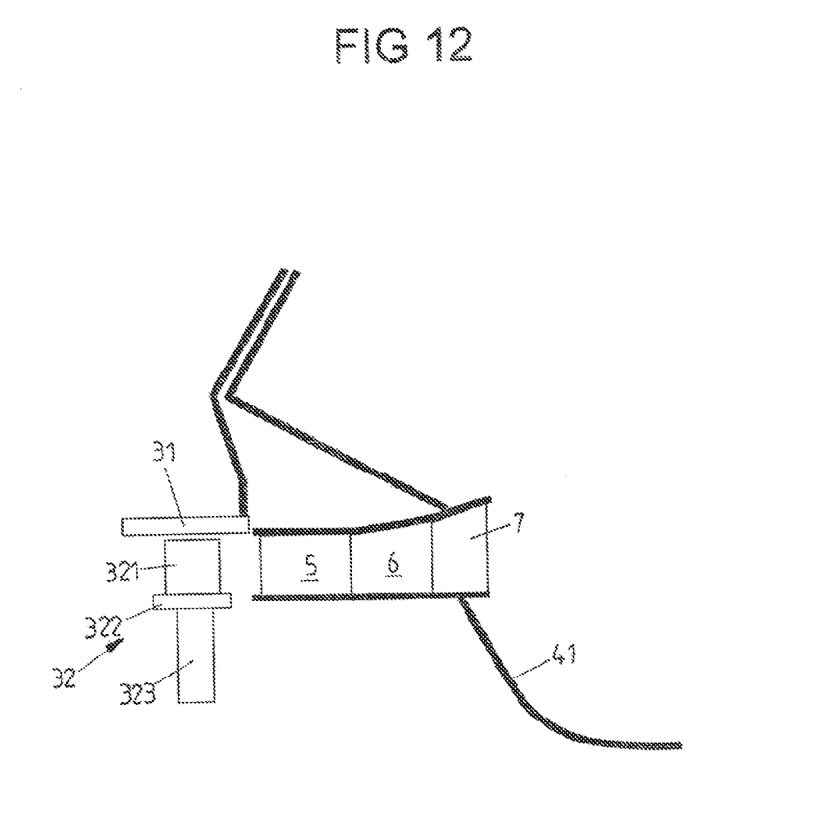
FIG. 12 shows an assembly having an outlet guide vane and a compressor in accordance with the state of the art.

FIG. 12 shows an assembly including an outlet guide vane 5 and a diffuser 6, where the diffuser is designed with struts 7 used for absorbing mechanical loads. The outlet guide vane 5 and the diffuser 6 form an integral component which is for example designed as an inexpensive casting. The integral component is structurally connected to an inner combustion chamber casing 41 of the combustion chamber of the axial turbomachine. Accordingly, the component including the outlet guide vane 5 and the diffuser 6 is physically separate from an upstream axial compressor, of which FIG. 12 shows a compressor casing 31 plus the last rotor stage 32 with a rotor 321, a rotor hub 322 and a rotor disk 323.

Figure 1:
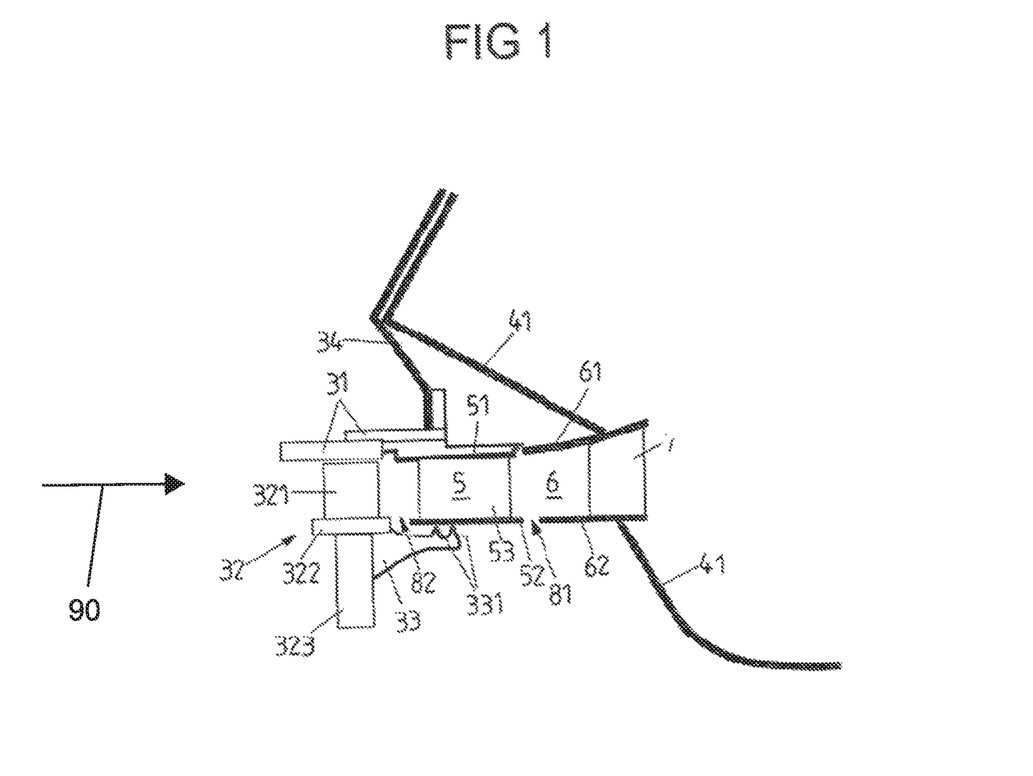
FIG. 1 shows a first exemplary embodiment of an assembly having at least one outlet guide vane and a diffuser, with the outlet guide vane being connected to a compressor and the diffuser being connected to a combustion chamber, and with the assembly including a shroud between a rotor stage and the outlet guide vane.

FIG. 1 shows a first exemplary embodiment of the present invention.

The assembly shown in FIG. 1 includes an outlet guide vane 5 and a diffuser 6 arranged downstream of the outlet guide vane 5 in the flow direction 90. The outlet guide vane 5 is connected to a compressor casing 31. The diffuser 6 is connected to an inner combustion chamber casing 41 of a combustion chamber otherwise not shown. There is no direct mechanical connection between the diffuser 6 and the outlet guide vane 5. Accordingly, there is a leakage gap 81 between the outlet guide vane 5 and the diffuser 6.

The outlet guide vane 5 includes an outer casing 51 (which can also be referred to as casing ring), an outlet guide vane hub 52 radially inward thereto and a row of blades 53, which in the exemplary embodiment in FIG. 1 is mounted on both sides, i.e. both on the outer casing 51 and on the outlet guide vane hub 52. The outer casing 51 is here mechanically connected to the compressor casing 31, or the outer casing 51 forms part of the compressor casing 31. The compressor casing 31 is mechanically connected to the inner combustion chamber casing 41 by structural elements 34.

The diffuser 6 includes an outer diffuser ring 61 and an inner diffuser ring 62. Furthermore, struts 7 can be integrated into the diffuser, as is the case in FIG. 1. The struts 7 are here located for example at the downstream end of the diffuser 6. They connect the outer diffuser ring 61 to the inner diffuser ring 62 and thereby permit mechanical loads to be absorbed. These struts 7 are however only optional when other components are provided for absorbing mechanical loads.

The axial flow passes inside the assembly between the rotor hub 322 and the compressor casing 31, between the outlet guide vane hub 52 and the outer casing 51, and between the inner diffuser ring 62 and the outer diffuser ring 61. The outlet guide vane 5 is used to remove the swirl from the flow and to axially align the latter. The kinetic energy of the flow is transformed in the diffuser 6 into a static pressure increase and the flow is then supplied to the combustion chamber.

In the exemplary embodiment of FIG. 1, a leakage gap 82 located between the rotor 32 and the outlet guide vane 5 is sealed by a shroud 33 including two sealing lips 331 contacting the outlet guide vane hub 52. Leakage air for cooling the high-pressure turbine of the jet engine is therefore tapped solely from the leakage gap 81.

The diffuser 6 with the struts 7 is for example designed as an inexpensive casting. The outlet guide vane 5 is by contrast designed in a high quality with regard to production tolerances, geometry and surface finish, so that there are only minor outlet guide vane losses and an improved flow deflection. To achieve this, the outlet guide vane is manufactured for example by forging, milling, sintering, EDM or grinding.

The outlet guide vane can be designed here as a one-piece component including the row of blade 53, the outer casing 51 and the outlet guide vane hub 52. Alternatively, it can also be provided that individual elements of the outlet guide vane 5, for example the row of blades 53, or the row of blades 53 in conjunction with the outer casing 52, are manufactured separately and then connected to other parts of the outlet guide vane 5, where a connection of this type can be achieved either beforehand by providing a sub-assembly or with the connection to the compressor.

Figure 2:
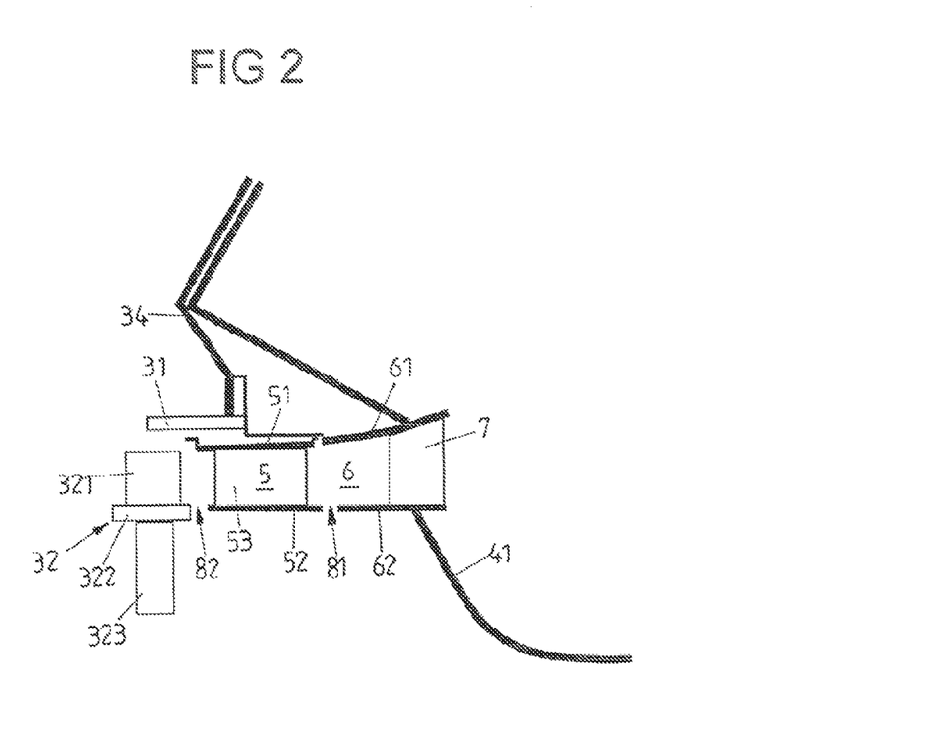
FIG. 2 shows an assembly having an outlet guide vane and a diffuser in accordance with FIG. 2, without using a shroud.

FIG. 2 shows a further exemplary embodiment of an assembly with an outlet guide vane 5 and a diffuser 6 designed as separate components without direct connection to one another. The exemplary embodiment in FIG. 2 differs from the exemplary embodiment in FIG. 1 in that a shroud 33 (cf. FIG. 1) is dispensed with. Accordingly, leakage air can escape both through the leakage gap 82 between the rotor 32 and the outlet guide vane 5 and through the leakage gap 81 between the outlet guide vane 5 and diffuser 6. The leakage flow can be influenced and improved by the combination of the two leakage gaps 81, 82.

Figure 3:
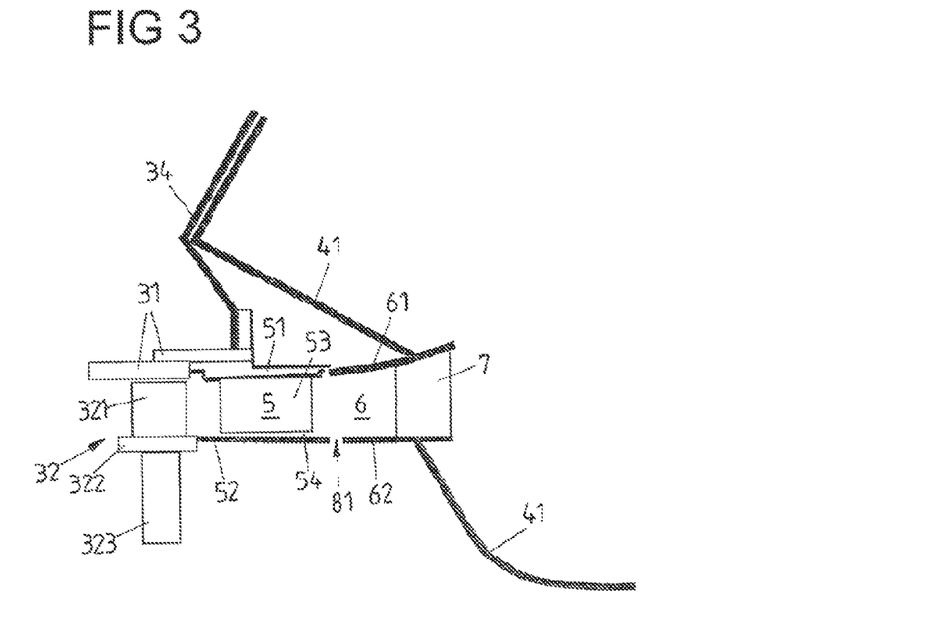
FIG. 3 shows a further exemplary embodiment of an assembly having at least one outlet guide vane and a diffuser, with the blades of the outlet guide vane being mounted on one side forming a hub gap.

FIG. 3 shows an exemplary embodiment of an assembly with an outlet guide vane 5 and a diffuser 6 that differs from the exemplary embodiment of FIGS. 1 and 2 in that unlike in FIGS. 1 and 2, the blades 53 of the outlet guide vane are not mounted on both sides, but only on one side, so that the blades 53 are only connected to the outer casing 51 of the outlet guide vane 5. The outlet guide vane hub 52 is now part of the rotor hub 322 or of the rotor disk 323. It is for example designed as an integral component with the rotor hub 322 or the rotor disk 323, or is bolted or welded to them. The hub 52 of the outlet guide vane 5 is accordingly designed rotating.

Between the ends of the blades 53 of the outlet guide vane 5 and the hub 52, there is necessarily a gap 54, referred to as hub gap. This hub gap 54 is preferably designed as narrow as possible. Alternatively, the hub gap 54 can be used to selectively supply air to the leakage gap 81.

It is pointed out that in the exemplary embodiment of FIG. 3, the leakage gap 82 present in FIGS. 1 and 2 between the rotor stage 32 and the outlet guide vane 5 is automatically closed due to the connection between the outlet guide vane hub 52 and the rotor hub 322.

The following FIGS. 4 to 9 show exemplary embodiments of an assembly which each include two outlet guide vanes 5a, 5b arranged in tandem one behind the other in the flow direction, where each outlet guide vane includes a row of blades 53a, 53b. A tandem arrangement of this type has the advantage that lower flow losses occur during deflection of the flow. To achieve this, a defined tangential and axial distance is set between the respective blades of the blade rows of the two outlet guide vanes 5a, 5b. Separate manufacture and design of the outlet guide vanes 5a, 5b as separate parts permits an exact manufacture of the outlet guide vanes 5a, 5b with low tolerances.

Figure 4:
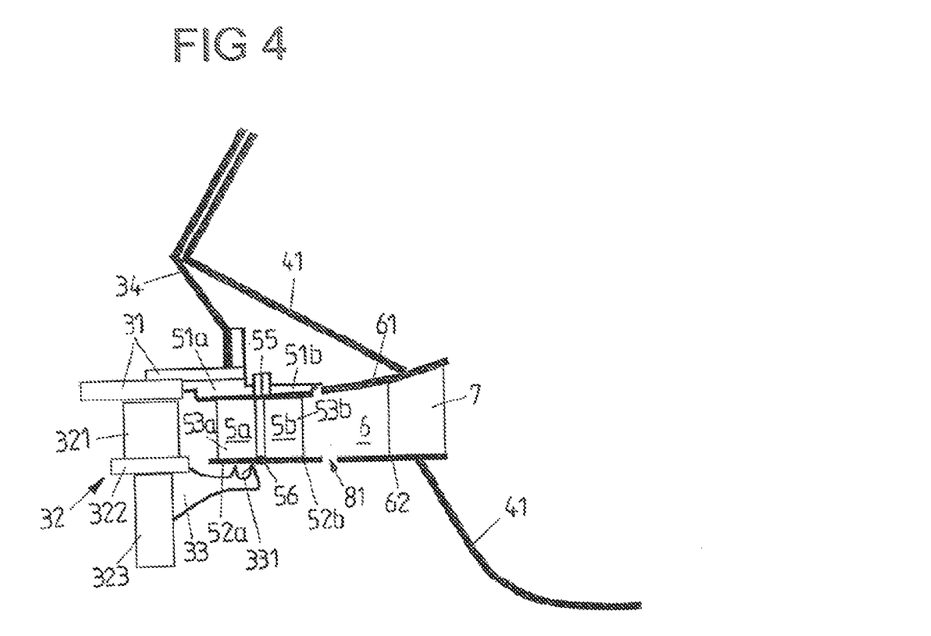
FIG. 4 shows a further exemplary embodiment of an assembly having at least one outlet guide vane and a diffuser, with two outlet guide vanes being provided in tandem arrangement, using a shroud.

In accordance with the exemplary embodiment in FIG. 4, which apart from the fact of using two outlet guide vanes 5a, 5b largely corresponds to the exemplary embodiment of FIG. 1, two outlet guide vanes 5a, 5b are provided that each have an outer casing 51a, 51b, a hub 52a, 52b and blades 53a, 53b. The two outlet guide vanes 5a, 5b are manufactured as separate parts and connected to one another using flange connections 55 and/or welded connections 56. In the exemplary embodiment of FIG. 4 it is provided that the hubs 52a, 52b of the two outlet guide vanes 5a, 5b are welded to one another and the two outer casings 51a, 51b of the outlet guide vanes 5a, 5b are connected to one another using a flange connection 55. These connection types must however only be understood as examples. In particular, a connection in both connection areas is possible by means of welded or flange connections.

It is pointed out that in the exemplary embodiment in FIG. 4, similarly to the exemplary embodiment in FIG. 1, a shroud 33 with sealing lips 331 is provided that covers a leakage gap between the rotor 32 and the first outlet guide vane 5a in the flow direction.

In the exemplary embodiment of FIG. 4, both outlet guide vanes 5a, 5b are structurally connected to the compressor, whereas the diffuser 6 is structurally connected to the combustion chamber. To that extent, there are no differences to the exemplary embodiments of FIGS. 1 to 3.

Figure 5:
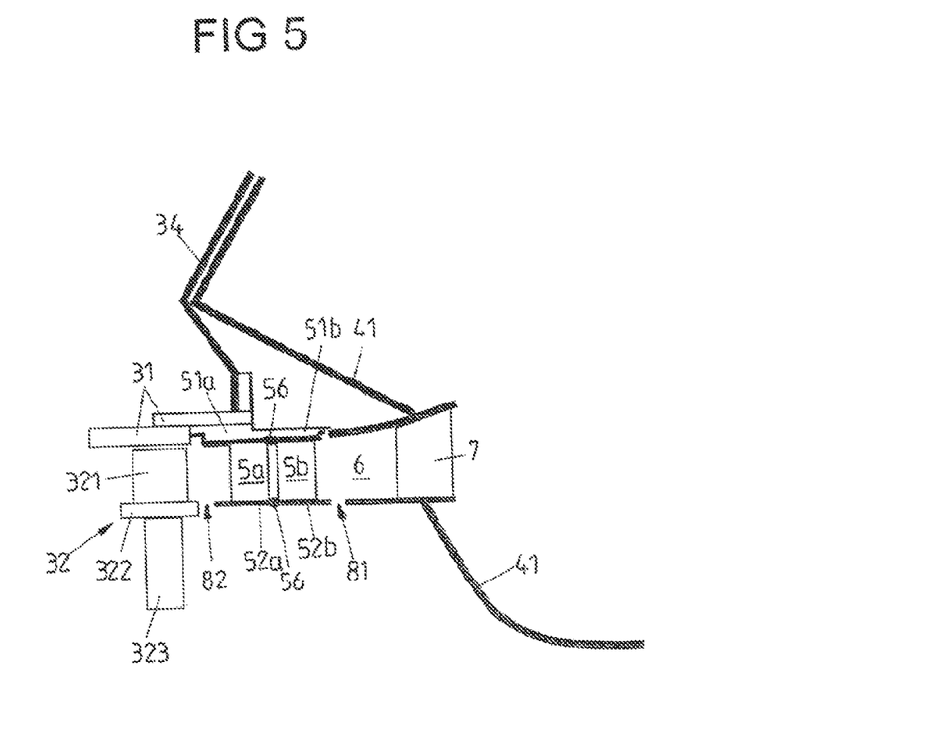
FIG. 5 shows a further exemplary embodiment of an assembly having at least one outlet guide vane and a diffuser, with two outlet guide vanes being provided in tandem arrangement, without using a shroud.

FIG. 5 shows an exemplary embodiment of an assembly that differs from the exemplary embodiment in FIG. 4 by the fact that no shroud (cf. shroud 33 in FIG. 4) is provided between the rotor 32 and the tandem outlet guide vane 5a, 5b. Accordingly, two leakage gaps 81, 82 are provided for supplying leakage air, similarly to the exemplary embodiment in FIG. 2. The connection between the outlet guide vanes 5a, 5b designed as separate components is achieved in FIG. 5 by two welded connections 56.

Figure 6:
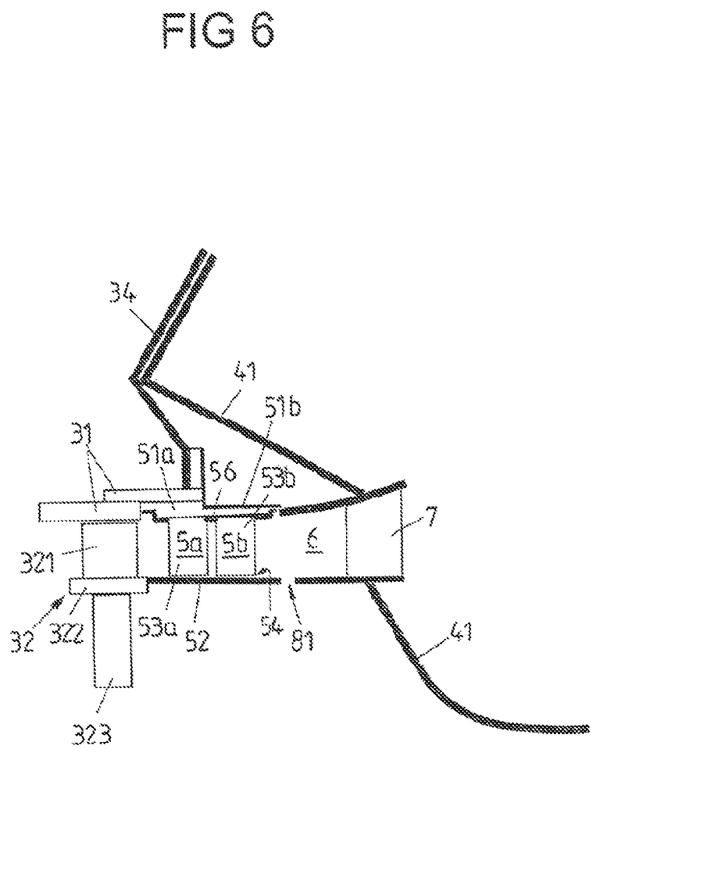
FIG. 6 shows a further exemplary embodiment of an assembly having at least one outlet guide vane and a diffuser, with two outlet guide vanes being provided in tandem arrangement, with the blades of the outlet guide vane being mounted on one side forming a hub gap.

FIG. 6 shows an alternative exemplary embodiment, in which, similarly to the exemplary embodiment in FIG. 3, the blades 53a, 53b of the outlet guide vane are mounted on one side and accordingly a hub gap 54 is provided between the ends of the blades 53a, 53b of the outlet guide vane and the hub 52. The outlet guide vane hub 52 is here designed in common for both outlet guide vanes 5a, 5b and is connected to the rotor hub 322 or the rotor disk 323, so that the outlet guide vane hub 52 rotates together with the rotor 32. In the area of the outer casings 51a, 51b, the outlet guide vanes 5a, 5b of the tandem arrangement are connected to one another by means of a welded connection 56.

The design of the blades 53a, 53b of the outlet guide vane in a one-sided mounting on the outer casing 51a, 51b with the provision of free ends of the blades 53a, 53b adjoining the hub gap 54 has the advantage of simpler manufacturability of the blades 53a, 53b.

Figure 7:
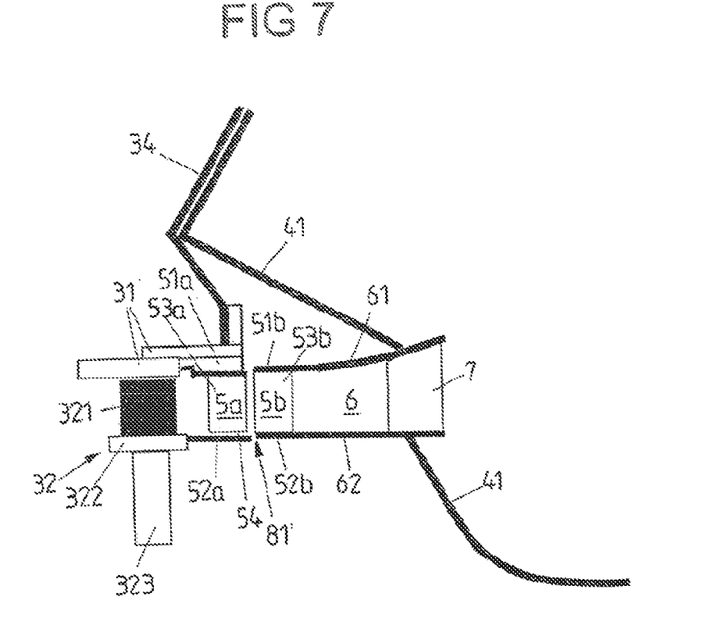
FIG. 7 shows a further exemplary embodiment of an assembly having at least one outlet guide vane and a diffuser, with the assembly including two outlet guide vanes in tandem arrangement, one of these outlet guide vanes being connected to the compressor and the other one to the diffuser, and with the blades of the outlet guide vane connected to the compressor being mounted on one side forming a hub gap.

FIG. 7 shows an exemplary embodiment of an assembly that differs from the exemplary embodiments of FIGS. 4 to 6 in that not both of the two outlet guide vanes 5a. 5b of a tandem arrangement are connected to the compressor, but only one. In accordance with FIG. 7, therefore, the outlet guide vane 5a of the tandem arrangement axially upstream in the flow direction is connected to the compressor. To do so, an outer casing 51a, into which the blades 53a are mounted on one side, is connected to the compressor casing 31 or is designed in one piece with the latter. The hub 52a of this outlet guide vane 5a is, similarly to the exemplary embodiment in FIG. 6, connected to the rotor hub 322 and designed rotating, where a hub gap 54 is provided between the ends of the blades 53a and the hub 52a.

Unlike in the exemplary embodiment in FIGS. 4 to 6, however, the further outlet guide vane 5b is connected to the diffuser 6. This can be achieved in that the components forming the second outlet guide vane 5b are connected (in particular welded or bolted) to the diffuser 6, or in that the second outlet guide vane 5b and the diffuser 6, possibly together with struts 7, are designed in one piece, for example as a casting. The latter design variant is shown in FIG. 7, where the outer casing 51b and the hub 52b of the downstream outlet guide vane 5b are formed by the same annular surfaces that also form the outer diffuser ring 61 and the inner diffuser ring 61 of the diffuser 6. The leakage gap 81' now passes between the two outlet guide vanes 5a, 5b.

The embodiment in FIG. 7 thus provides for a split assignment of the two outlet guide vanes 5a, 5b of the tandem arrangement to the compressor module and to the combustion chamber module.

Figure 8:
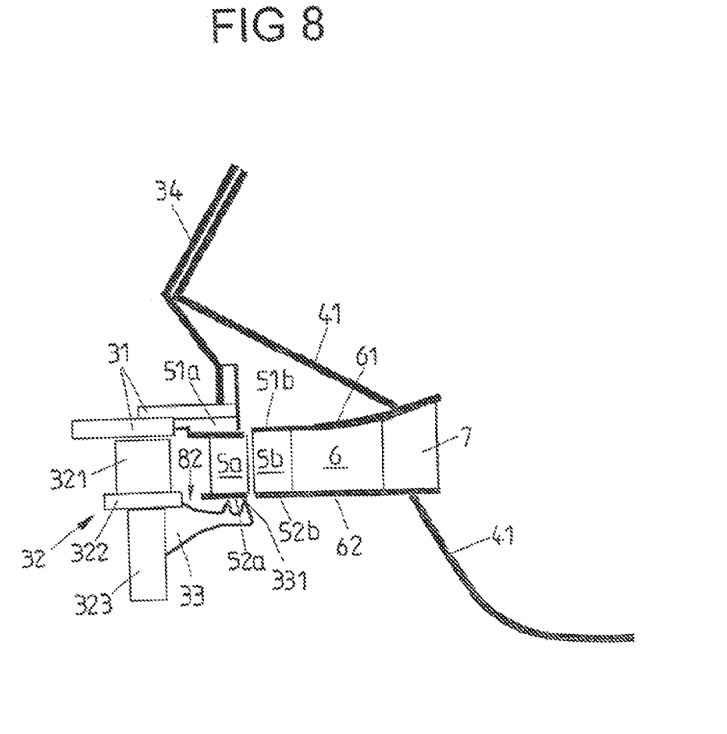
FIG. 8 shows an assembly in accordance with FIG. 7, however with the blades of the outlet guide vane connected to the compressor being mounted on both sides and a shroud being additionally provided.

FIG. 8 shows an exemplary embodiment corresponding to the exemplary embodiment in FIG. 7 apart from the fact that the upstream outlet guide vane 5a in the axial direction forms a hub 52a which is an integral part of the outlet guide vane 5a. For closing a leakage gap 82 between the last rotor stage 32 and the first outlet guide vane 5a, a shroud 33 with sealing lips 331 is provided, similarly to what is shown in FIGS. 1 and 4.

Figure 9:
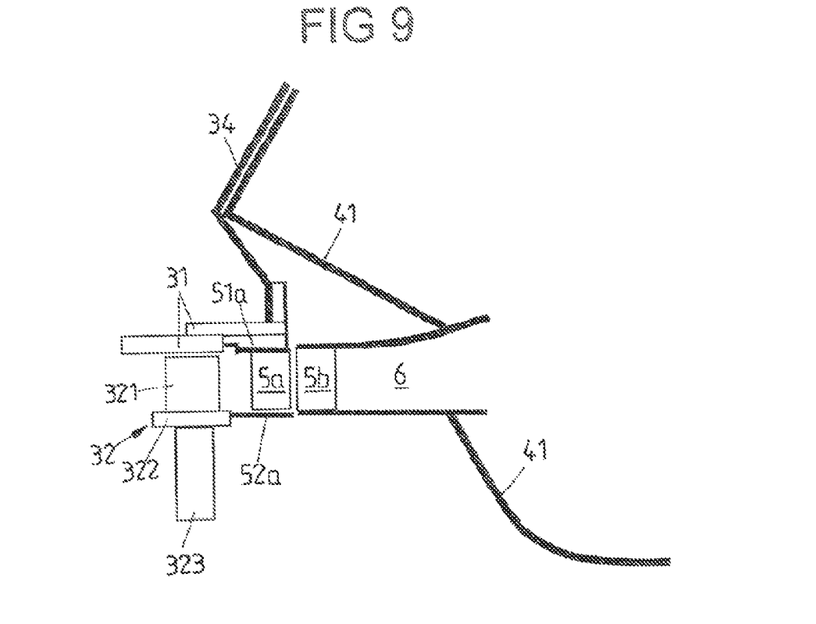
FIG. 9 shows an assembly in accordance with FIG. 7, however without struts integrated into the diffuser.

The assembly in FIG. 9 differs from the assembly in FIG. 7 by the fact that the diffuser has no integrated struts 7. Instead it is provided that the second outlet guide vane 5b integrated into the diffuser 6 is designed such that its blades 53b simultaneously form struts suitable for absorbing mechanical loads. The blades 53b of the outlet guide vane 5b thus have not only an aerodynamic profile for deflecting the flow, but also mechanical properties.

Figure 10:
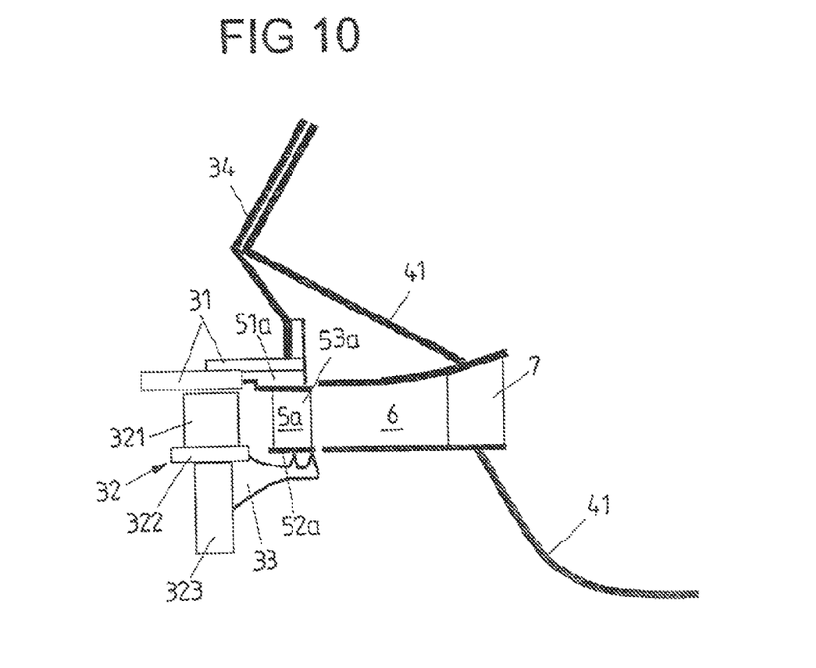
FIG. 10 shows an assembly in accordance with FIG. 8, with an outlet guide vane connected to the compressor being dispensed with and the functionality of the outlet guide vane being integrated into the struts of the diffuser.

FIG. 10 shows an alternative to the exemplary embodiment in FIG. 8, where in this exemplary embodiment the second outlet guide vane 5b of FIG. 8 is omitted. Despite this, the existing outlet guide vane 5a has a relatively short length in the flow direction. To compensate for this, it is provided that the struts 7 have an aerodynamic profile effecting a further deflection of the airflow before entry into the combustion chamber. In the exemplary embodiment in FIG. 10, deflection functions which in the exemplary embodiment in FIG. 8 are performed by the second outlet guide vane 5*b* are therefore handled by the struts 7. Such a modification can also be achieved by the exemplary embodiment in FIG. 7.

The present invention in its design is not limited to the above mentioned exemplary embodiments which are to be understood merely as examples. In particular, the type of connection of the outlet guide vane to the compressor, the type of connection of the diffuser to the combustion chamber and the embodiments of the outlet guide vane and of the compressor must be understood merely as examples.

The invention claimed is:

1. An assembly of an axial turbomachine, comprising:
   a compressor;
   a combustion chamber arranged downstream of the compressor in a flow direction:
   at least one outlet guide vane of the compressor, the at least one outlet guide vane rotationally fixed with respect to the compressor and including a plurality of blades; and
   a diffuser arranged downstream of the at least one outlet guide vane in the flow direction,
   wherein the at least one outlet guide vane is connected to the compressor and the diffuser is connected to the combustion chamber, with no direct mechanical connection between the diffuser and the at least one outlet guide vane;
   a leakage gap positioned between the at least one outlet guide vane and the diffuser in the flow direction;
   wherein the at least one outlet guide vane is connected to an outer casing of the compressor.

2. The assembly in accordance with claim 1, wherein the diffuser is connected to an inner combustion chamber casing of the combustion chamber.

3. The assembly in accordance with claim 1, wherein the at least one outlet guide vane includes a hub gap extending between blade ends of the blades and a hub of the outlet guide vane.

4. The assembly in accordance with claim 3, wherein the compressor includes a rotor arranged upstream of the outlet guide vane in the flow direction, the rotor including a rotor disk and a rotor hub, with the hub of the at least one outlet guide vane being separate from the blades of the at least one outlet guide vane and connected to at least one chosen from the rotor hub and the rotor disk.

5. The assembly in accordance with claim 3, wherein the at least one outlet guide vane includes at least two outlet guide vanes provided in tandem arrangement behind one another in the flow direction, with each outlet guide vane forming a blade row and the blade rows of the at least two outlet guide vanes being fastened on one side to an outer casing of the compressor, wherein the compressor includes a rotor arranged upstream of the at least two outlet guide vanes in the flow direction, the rotor including a rotor disk and a rotor hub, with the hub of the at least two outlet guide vanes being separate from the blade rows of the at least two outlet guide vanes and connected to at least one chosen from the rotor hub and the rotor disk.

6. The assembly in accordance with claim 1, wherein the at least one outlet guide vane includes a hub attached to ends of the blades such that the hub forms an integral part of the at least one outlet guide vane.

7. The assembly in accordance with claim 6, and further comprising a shroud that at least partially closes a leakage gap between the at least one outlet guide vane and a rotor arranged upstream of the at least one outlet guide vane in the flow direction.

8. The assembly in accordance with claim 1, wherein the at least one outlet guide vane includes at least two outlet guide vanes provided in tandem arrangement behind one another in the flow direction, with each of the at least two outlet guide vanes forming a blade row.

9. The assembly in accordance with claim 8, wherein the at least two outlet guide vanes are separate parts bolted to one another.

10. The assembly in accordance with claim 8, wherein at least one of the at least two out guide vanes is connected to the compressor, and at least one of the at least two outlet guide vanes is at least one chosen from connected to the diffuser and integral with the diffuser.

11. The assembly in accordance with claim 10, and further comprising struts integrated into the diffuser for absorbing mechanical loads, with the at least two outlet guide vanes being connected to the diffuser.

12. The assembly in accordance with claim 1, and further comprising struts integrated into the diffuser for absorbing mechanical loads.

13. The assembly in accordance with claim 12, wherein the struts deflect an airflow through the diffuser.

14. The assembly in accordance with claim 1, and further comprising a shroud that at least partially closes a leakage gap between the at least one outlet guide vane and a rotor arranged upstream of the at least one outlet guide vane in the flow direction.

15. A method for manufacturing an assembly of an axial turbomachine, comprising:
   providing a compressor;
   providing a combustion chamber arranged downstream of the compressor in a flow direction;
   providing at least one outlet guide vane of the compressor, with the at least one outlet guide vane being rotationally fixed with respect to the compressor;
   providing a diffuser arranged downstream of the at least one outlet guide vane in the flow direction;
   separately manufacturing the at least one outlet guide vane and the diffuser,
   connecting the at least one outlet guide vane to an outer casing of the compressor and connecting the diffuser to the combustion chamber, with no direct mechanical connection between the diffuser and the at least one outlet guide vane;
   positioning a leakage gap between the at least one outlet guide vane and the diffuser in the flow direction.

16. The method in accordance with claim 15, and further comprising manufacturing the at least one outlet guide vane by at least one chosen from electrical discharge machining (EDM), grinding, milling, sintering and electrochemical machining (ECM).

17. The method in accordance with claim 15, and further comprising providing the diffuser as a casting.

18. The method in accordance with claim 15, and further comprising providing a shroud that at least partially closes a leakage gap between the at least one outlet guide vane and a rotor arranged upstream of the at least one outlet guide vane in the flow direction.

* * * * *